US012663612B2

(12) United States Patent
    Shin et al.

(10) Patent No.: US 12,663,612 B2
(45) Date of Patent: Jun. 23, 2026

(54) OPTICAL IMAGING SYSTEM

(71) Applicant: Samsung Electro-Mechanics Co., Ltd.,
     Suwon-si (KR)

(72) Inventors: Kil Soo Shin, Suwon-si (KR); **Yong
     Joo Jo**, Suwon-si (KR)

(73) Assignee: Samsung Electro-Mechanics Co., Ltd.,
     Suwon-si (KR)

( * ) Notice: Subject to any disclaimer, the term of this
     patent is extended or adjusted under 35
     U.S.C. 154(b) by 28 days.

(21) Appl. No.: 18/413,611

(22) Filed: Jan. 16, 2024

(65) Prior Publication Data

US 2024/0151942 A1      May 9, 2024

Related U.S. Application Data

(63) Continuation of application No. 17/975,503, filed on
     Oct. 27, 2022, now Pat. No. 11,914,224, which is a
     continuation of application No. 17/166,504, filed on
     Feb. 3, 2021, now Pat. No. 11,988,896.

(30) Foreign Application Priority Data

Jun. 5, 2020     (KR) ........................ 10-2020-0068432

(51) Int. Cl.
     G02B 9/64          (2006.01)
     G02B 13/00         (2006.01)
(52) U.S. Cl.
     CPC ........... G02B 9/64 (2013.01); G02B 13/0045
                                              (2013.01)
(58) Field of Classification Search
     CPC ... G02B 13/0045; G02B 9/64; G02B 27/0025
     See application file for complete search history.

(56) References Cited

U.S. PATENT DOCUMENTS

| 8,599,495 | B1 | 12/2013 | Tsai et al. |
| 8,773,779 | B2 | 7/2014 | Take |
| 2012/0188654 | A1 | 7/2012 | Huang |
| 2016/0033742 | A1 | 2/2016 | Huang |

(Continued)

FOREIGN PATENT DOCUMENTS

| CN | 103529539 A | 1/2014 |
| CN | 104950425 A | 9/2015 |

(Continued)

OTHER PUBLICATIONS

Taiwanese Office Action issued on Jul. 3, 2024, in counterpart
Taiwanese Patent Application No. 112147774 (4 pages in English,
5 pages in Chinese).

(Continued)

*Primary Examiner* — Jack Dinh
(74) *Attorney, Agent, or Firm* — NSIP Law

(57) ABSTRACT

An optical imaging system includes a first lens, a second
lens, a third lens, a fourth lens, a fifth lens, a sixth lens, and
a seventh lens sequentially disposed in ascending numerical
order along an optical axis from an object side of the optical
imaging system toward an imaging plane of an image sensor,
wherein TTL/(2*IMG HT)≤0.67 is satisfied, where TTL is a
distance along the optical axis from an object-side surface of
the first lens to the imaging plane of the image sensor, and
IMG HT is one half of a diagonal length of the imaging
plane of the image sensor, and 15<v1-v3<45 is satisfied,
where v1 is an Abbe number of the first lens, and v3 is an
Abbe number of the third lens.

19 Claims, 10 Drawing Sheets

(56)                References Cited

U.S. PATENT DOCUMENTS

| | | | |
|---|---|---|---|
| 2016/0097918 | A1 | 4/2016 | Liao et al. |
| 2016/0124191 | A1 | 5/2016 | Hashimoto |
| 2016/0259152 | A1 | 9/2016 | Huang |
| 2017/0059826 | A1 | 3/2017 | Tang et al. |
| 2018/0239115 | A1 | 8/2018 | Hsu et al. |
| 2018/0348484 | A1 | 12/2018 | Chen et al. |
| 2019/0004285 | A1 | 1/2019 | Tamg et al. |
| 2019/0025551 | A1 | 1/2019 | Kuo |
| 2019/0121100 | A1 | 4/2019 | Song et al. |
| 2019/0146188 | A1 | 5/2019 | Lyu et al. |
| 2019/0361196 | A1 | 11/2019 | Chang et al. |
| 2019/0369362 | A1 | 12/2019 | Son et al. |
| 2019/0369368 | A1 | 12/2019 | Jung et al. |
| 2019/0384040 | A1 | 12/2019 | Tseng et al. |
| 2020/0064595 | A1 | 2/2020 | Huang |
| 2020/0158993 | A1 | 5/2020 | Park et al. |
| 2020/0174227 | A1 | 6/2020 | Nitta |
| 2020/0301110 | A1 | 9/2020 | Hsu et al. |
| 2021/0048631 | A1 | 2/2021 | Fukaya |
| 2021/0048638 | A1 | 2/2021 | Chen et al. |
| 2021/0132341 | A1 | 5/2021 | Xiao et al. |
| 2021/0149160 | A1 | 5/2021 | Dong et al. |
| 2022/0171163 | A1 | 6/2022 | Yamazaki et al. |
| 2022/0365317 | A1 | 11/2022 | Chen et al. |

FOREIGN PATENT DOCUMENTS

| | | | |
|---|---|---|---|
| CN | 105319680 | A | 2/2016 |
| CN | 105487208 | A | 4/2016 |
| CN | 107367827 | A | 11/2017 |
| CN | 107402433 | A | 11/2017 |
| CN | 108983388 | A | 12/2018 |
| CN | 109212717 | A | 1/2019 |
| CN | 109358416 | A | 2/2019 |
| CN | 110346919 | A | 10/2019 |
| CN | 110618522 | A | 12/2019 |
| CN | 110716287 | A | 1/2020 |
| CN | 110749977 | A | 2/2020 |
| CN | 110908073 | A | 3/2020 |
| CN | 108873256 | B | 4/2020 |
| CN | 111061034 | A | 4/2020 |
| CN | 111208629 | A | 5/2020 |
| JP | 2016-85431 | A | 5/2016 |
| JP | 2020-60722 | A | 4/2020 |
| KR | 10-2020-0021063 | A | 2/2020 |
| KR | 10-2071924 | B1 | 2/2020 |
| TW | 201403166 | A | 1/2014 |
| TW | 201908798 | A | 3/2019 |
| TW | I679443 | B | 12/2019 |

OTHER PUBLICATIONS

Taiwanese Office Action issued on Nov. 29, 2021, in counterpart Taiwanese Patent Application No. 110104365 (9 pages in English, 13 pages in Chinese).

Korean Office Action issued on Mar. 7, 2022, in counterpart Korean Patent Application No. 10-2020-0068432 (7 pages in English, 5 pages in Korean).

Chinese Office Action issued on Jul. 25, 2022, in counterpart Chinese Patent Application No. 202110623538.8 (9 pages in English, 12 pages in Chinese).

Korean Office Action issued on Oct. 17, 2022, in counterpart Korean Patent Application No. 10-2022-0125355 (7 pages in English, 5 pages in Korean).

Chinese Office Action issued on Nov. 23, 2022, in counterpart Chinese Patent Application No. 202210426329.9 (5 pages in English, 6 pages in Chinese).

Taiwanese Office Action issued on May 4, 2023, in counterpart Taiwanese Patent Application No. 111137641 (6 pages in English, 6 pages in Chinese).

U.S. Appl. No. 17/166,504, filed Feb. 3, 2021, Kil Soo Shin et al.

U.S. Appl. No. 17/975,503, filed Oct. 27, 2022, Kil Soo Shin et al.

Chinese Office Action issued on Jun. 9, 2025, in counterpart Chinese Patent Application No. 202211287110.1 (4 pages in English, 8 pages in Chinese).

Taiwanese Office Action issued on Apr. 15, 2026, in counterpart Taiwanese Patent Application No. 114113106 (8 pages in English, 8 pages in Chinese).

OPTICAL IMAGING SYSTEM

CROSS-REFERENCE TO RELATED APPLICATIONS

This application is a continuation of application Ser. No. 17/975,503 filed on Oct. 27, 2022, now U.S. Pat. No. 11,914,224 issued on Feb. 27, 2024, which is a continuation of application Ser. No. 17/166,504 filed on Feb. 3, 2021, now U.S. Pat. No. 11,988,896 issued on May 21, 2024, and claims the benefit under 35 USC 119 (a) of Korean Patent Application No. 10-2020-0068432 filed on Jun. 5, 2020, in the Korean Intellectual Property Office, the entire disclosures of which are incorporated herein by reference for all purposes.

BACKGROUND

1. Field

This application relates to an optical imaging system.

1. Description of Related Art

A portable terminal device has been designed to include a camera including an optical imaging system including a plurality of lenses to allow video calls to be performed and to take images and videos of an object.

As functions of a camera have been increased in a portable terminal device, there has been an increasing demand for a camera used in a portable terminal device to have a high resolution.

As a portable terminal device has been designed to have a reduced size, it has been necessary for a camera used in a portable terminal device to have a reduced size.

Thus, there has been a need to develop an optical imaging system having a reduced size and a high resolution.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens, and a seventh lens sequentially disposed in ascending numerical order along an optical axis from an object side of the optical imaging system toward an imaging plane of an image sensor, wherein TTL/(2*IMG HT)≤0.67 is satisfied, where TTL is a distance along the optical axis from an object-side surface of the first lens to the imaging plane of the image sensor, and IMG HT is one half of a diagonal length of the imaging plane of the image sensor, and 15<v1-v3<45 is satisfied, where v1 is an Abbe number of the first lens, and v3 is an Abbe number of the third lens.

Any one or any combination of any two or more of 25<v1-v2<45, 25<v1-v4<45, and 15<v1-v5<45 may be satisfied, where v2 is an Abbe number of the second lens, v4 is an Abbe number of the fourth lens, and v5 is an Abbe number of the fifth lens.

Fno<2.0 may be satisfied, where Fno is an f-number of the optical imaging system.

0<f1/f<2 may be satisfied, where f1 is a focal length of the first lens, and f is a focal length of the optical imaging system.

−3.5<f2/f<0 may be satisfied, where f2 is a focal length of the second lens, and f is a focal length of the optical imaging system.

3/f>1.5 may be satisfied, where f3 is a focal length of the third lens, and f is a focal length of the optical imaging system.

−9<f4/f<0 may be satisfied, where f4 is a focal length of the fourth lens, and f is a focal length of the optical imaging system.

−30<f5/f<20 may be satisfied, where f5 is a focal length of the fifth lens, and f is a focal length of the optical imaging system.

TTL/f<1.4 may be satisfied, where f is a focal length of the optical imaging system, and BFL/f<0.4 may be satisfied, where BFL is a distance along the optical axis from an image-side surface of the seventh lens to the imaging plane of the image sensor.

−1<f1/f2<0 may be satisfied, where f1 is a focal length of the first lens, and f2 is a focal length of the second lens.

−2<f2/f3<0 may be satisfied, where f2 is a focal length of the second lens, and f3 is a focal length of the third lens.

D1/f<0.3 may be satisfied, where D1 is a distance along the optical axis from an image-side surface of the first lens to an object-side surface of the second lens, and f is a focal length of the optical imaging system.

0.4<SD5/IMG HT<0.7 may be satisfied, where SD5 is an effective aperture radius of an image-side surface of the fifth lens.

0.6<SD6/IMG HT<0.8 may be satisfied, where SD6 is an effective aperture radius of an image-side surface of the sixth lens.

0.7<SD7/IMG HT<1 may be satisfied, where SD7 is an effective aperture radius of an image-side surface of the seventh lens.

−5<f2/f6<0 may be satisfied, where f2 is a focal length of the second lens, and f6 is a focal length of the sixth lens.

0<f2/f7<5 may be satisfied, where f2 is a focal length of the second lens, and f7 is a focal length of the seventh lens.

0<f6/f<2 may be satisfied, where f6 is a focal length of the sixth lens, and f is a focal length of the optical imaging system.

−2<f7/f<0 may be satisfied, where f7 is a focal length of the seventh lens, and f is a focal length of the optical imaging system.

74°<FOV<90° may be satisfied, where FOV is a field of view of the optical imaging system.

1<f12/f<2 may be satisfied, where f12 is a combined focal length of the first lens and the second lens, and f is a focal length of the optical imaging system.

The first lens may have a positive refractive power, the second lens may have a negative refractive power, the third lens may have a positive refractive power, the fourth lens may have a negative refractive power, the fifth lens may have a negative refractive power, the sixth lens may have a positive refractive power, and the seventh lens may have a negative refractive power.

In another general aspect, an optical imaging system includes a first lens, a second lens, a third lens, a fourth lens, a fifth lens, a sixth lens, and a seventh lens sequentially disposed in ascending numerical order along an optical axis from an object side of the optical imaging system toward an imaging plane of an image sensor, wherein 15<v1-v3<45 is satisfied, where v1 is an Abbe number of the first lens, and v3 is an Abbe number of the third lens.

All of 25<v1-v2<45, 25<v1-v4<45, and 15<v1-v5<45 may be satisfied, where v2 is an Abbe number of the second lens, v4 is an Abbe number of the fourth lens, and v5 is an Abbe number of the fifth lens.

The first lens may have a positive refractive power, the second lens may have a negative refractive power, the third lens may have a positive refractive power, the fourth lens may have a negative refractive power, the fifth lens may have a negative refractive power, the sixth lens may have a positive refractive power, and the seventh lens may have a negative refractive power.

The first lens may have a convex object-side surface and a concave image-side surface, the second lens may have a convex object-side surface and a concave image-side surface, the fourth lens may have a convex object-side surface and a concave image-side surface, the fifth lens may have a convex object-side surface and a concave image-side surface, the sixth lens may have a convex object-side surface and a concave image-side surface, and the seventh lens may have a concave image-side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
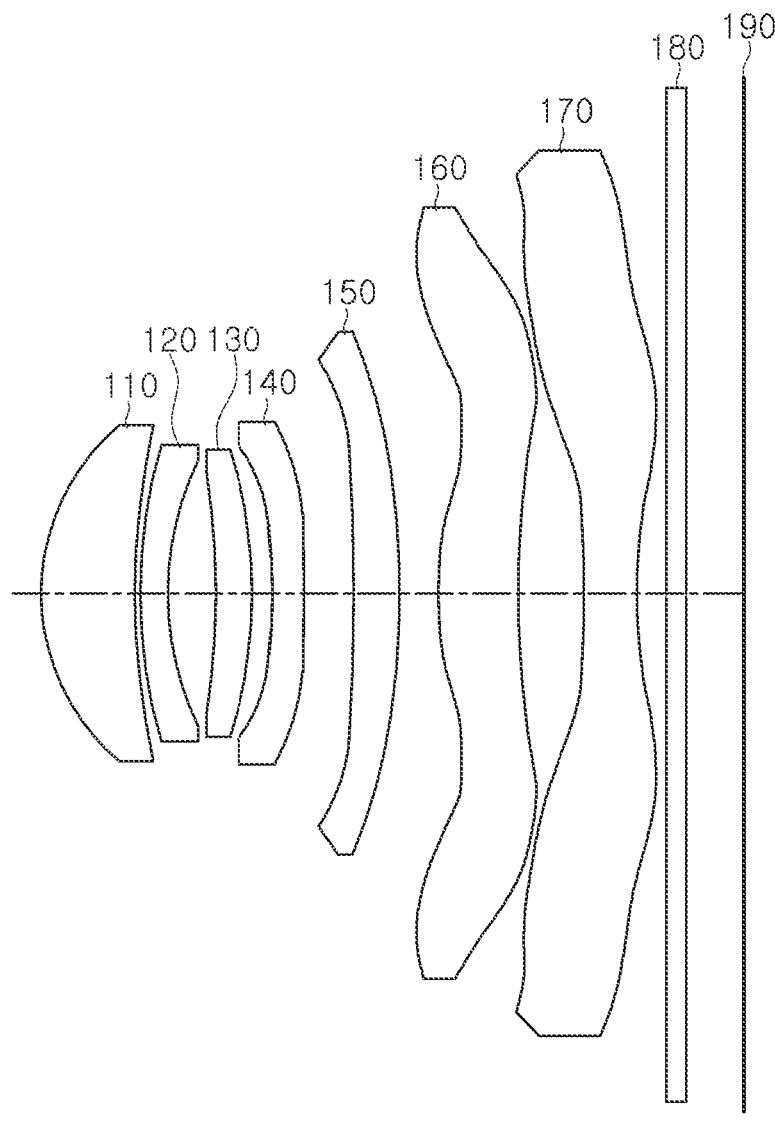
FIG. 1 is a diagram illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Use herein of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various elements, these elements are not to be limited by these terms. Rather, these terms are only used to distinguish one element from another element. Thus, a first element referred to in examples described herein may also be referred to as a second element without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not exclude the presence or addition of one or more other features, numbers, operations, members, elements, and/or combinations thereof.

The features of the examples described herein may be combined in various ways as will be apparent after an understanding of the disclosure of this application. Further-more, although the examples described herein have a variety of configurations, other configurations are possible as will be apparent after an understanding of the disclosure of this application.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

In the drawings, the thicknesses, sizes, and shapes of the lenses may be exaggerated for clarity and ease of illustration. The shapes of the spherical or aspherical surfaces of the lenses in the drawings are merely examples, and the spherical or aspherical surfaces are not limited to these shapes.

An optical imaging system according to this application may include seven lenses.

For example, the optical imaging system may include a first lens, a second lens, a third lens, a fourth lens, a fifth lens, a sixth lens, and a seventh lens sequentially disposed in ascending numerical order along an optical axis from an object side of the optical imaging system toward an imaging plane of the optical imaging system. The first to seventh lenses may be spaced apart from each other by predetermined distances along the optical axis.

Thus, the first lens is a lens closest to an object side of the optical imaging system, and the seventh lens is a lens closest to the imaging plane of the optical imaging system.

In each lens, a first surface or an object-side surface is a surface closest to the object side of the optical imaging system, and a second surface or an image-side surface is a surface closest to the imaging plane of the optical imaging system.

Radiuses of curvature of lens surfaces, thickness of the lenses and other elements, distances between the lenses and the other elements, focal lengths, TTL, BFL, IMG HT, SD5, SD6, and SD7 are expressed in millimeters (mm), FOV is expressed in degrees ('), and Fno, refractive indexes, and Abbe numbers are dimensionless quantities. The named quantities are defined later in this application.

The thicknesses of the lenses and the other elements, the distances between the lenses and the other elements, TTL, and BFL are measured along the optical axis of the optical imaging system.

Unless stated otherwise, a reference to the shape of a lens surface means a shape of a paraxial region of the lens surface. A paraxial region of a lens surface is a central portion of the lens surface surrounding an optical axis of the lens surface in which light rays incident to the lens surface make a small angle $\theta$ to the optical axis, and the approximations $\sin \theta \approx \theta$, $\tan \theta \approx \theta$, and $\cos \theta \approx 1$ are valid.

For example, a statement that a surface of a lens is convex, concave, or planar means that at least a paraxial region of the surface of the lens is convex, concave, or planar. Therefore, even though a surface of a lens may be described as being convex, a peripheral region of the surface of the lens may be concave or planar. Also, even though a surface of a lens may be described as being concave, a peripheral region of the surface of the lens may be convex or planar. Also, even though a surface of a lens may be described as being planar, a peripheral region of the surface of the lens may be convex or concave.

As described above, an optical imaging system according to his application may include first to seventh lenses. However, the optical imaging system is not limited to only the seven lenses, but may further include other elements if desired.

For example, the optical imaging system may further include an image sensor for converting an image of an object incident onto an imaging plane of the image sensor into an electrical signal.

Also, the optical imaging system may further include an infrared filter hereinafter referred to merely as a filter) for blocking infrared rays. The filter may be disposed between the seventh lens and the image sensor.

Also, the optical imaging system may further include a stop for adjusting an amount of light that is incident onto the imaging plane of the image sensor.

The first to seventh lenses may be made of a plastic material.

Also, at least one of the first to seventh lenses may have an aspherical surface. For example, each of the first to seventh lenses may have at least one aspherical surface.

In other words, at least one of a first surface and a second surface of each of the first to seventh lenses may be aspherical. Each aspherical surface of the first to seventh lenses is defined by Equation 1 below.

$$Z = \frac{cY^2}{1 + \sqrt{1 - (1 + K)c^2 Y^2}} + AY^4 + \tag{1}$$
$$BY^6 + CY^8 + DY^{10} + EY^{12} + FY^{14} + GY^{16} + HY^{18} + JY^{20}$$

In Equation 1, c is a curvature of a lens surface and is equal to a reciprocal of a radius of curvature of the lens surface at an optical axis of the lens surface, K is a conic constant, Y is a distance from any point on the lens surface to the optical axis of the lens surface in a direction perpendicular to the optical axis of the lens surface, A to H and J are aspheric constants, and Z (also known as sag) is a distance in a direction parallel to the optical axis of the lens surface from the point on the lens surface at the distance Y from the optical axis of the lens surface to a tangential plane perpendicular to the optical axis and intersecting a vertex of the lens surface.

The first to seventh lenses may have a positive refractive power, a negative refractive power, a positive refractive power, a negative refractive power, a negative refractive power, a positive refractive power, and a negative refractive power, respectively.

The optical imaging system may satisfy any one or any combination of any two or more of Conditional Expressions 1 to 25 below:

| | |
|---|---|
| $0 < f1/f < 2$ | (Conditional Expression 1) |
| $25 < v1-v2 < 45$ | (Conditional Expression 2) |
| $15 < v1-v3 < 45$ | (Conditional Expression 3) |
| $25 < v1-v4 < 45$ | (Conditional Expression 4) |
| $15 < v1-v5 < 45$ | (Conditional Expression 5) |
| $-3.5 < f2/f < 0$ | (Conditional Expression 6) |
| $f3/f > 1.5$ | (Conditional Expression 7) |
| $-9 < f4/f < 0$ | (Conditional Expression 8) |
| $-30 < f5/f < 20$ | (Conditional Expression 9) |
| $0 < f6/f < 2$ | (Conditional Expression 10) |
| $-2 < f7/f < 0$ | (Conditional Expression 11) |
| $TTL/f < 1.4$ | (Conditional Expression 12) |
| $-1 < f1/f2 < 0$ | (Conditional Expression 13) |

$-2 < f2/f3 < 0$         (Conditional Expression 14)

$BFL/f < 0.4$         (Conditional Expression 15)

$D1/f < 0.3$         (Conditional Expression 16)

$0.4 < SD5/IMG\ HT < 0.7$         (Conditional Expression 17)

$0.6 < SD6/IMG\ HT < 0.8$         (Conditional Expression 18)

$0.7 < SD7/IMG\ HT < 1$         (Conditional Expression 19)

$0 < f2/f7 < 5$         (Conditional Expression 20)

$-5 < f2/f6 < 0$         (Conditional Expression 21)

$74° < FOV < 90°$         (Conditional Expression 22)

$Fno < 2.0$         (Conditional Expression 23)

$TTL/(2*IMG\ HT) \leq 0.67$         (Conditional Expression 24)

$1 < f12/f < 2$         (Conditional Expression 25)

In Conditional Expressions 1 to 25, f is a focal length of the optical imaging system, f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, and f12 is a combined focal length of the first lens and the second lens.

v1 is an Abbe number of the first lens, v2 is an Abbe number of the second lens, v3 is an Abbe number of the third lens, v4 is an Abbe number of the fourth lens, and v5 is an Abbe number of the fifth lens.

TTL is a distance along the optical axis from an object-side surface of the first lens to the imaging plane of the image sensor, BFL is a distance along the optical axis from an image-side surface of the seventh lens to the imaging plane of the image sensor, D1 is a distance along the optical axis between an image-side surface of the first lens and an object-side surface of the second lens, and IMG HT is one half of a diagonal length of the imaging plane of the image sensor.

FOV is a field of view of the optical imaging system, and Fno is an f-number of the optical imaging system, which is equal to the focal length f of the optical imaging system divided by an entrance pupil diameter of the optical imaging system and is indicative of a brightness of the optical imaging system.

SD5 is an effective aperture radius of an image-side surface of the fifth lens, SD6 is an effective aperture radius of an image-side surface of the sixth lens, and SD7 is an effective aperture radius of the image-side surface of the seventh lens.

An effective aperture radius of a lens surface is a radius of a portion of the lens surface through which light actually passes, and is not necessarily a radius of an outer edge of the lens surface. An object-side surface of a lens and an image-side surface of the lens may have different effective aperture radiuses.

Stated another way, an effective aperture radius of a lens surface is a distance in a direction perpendicular to an optical axis of the lens surface between the optical axis of the lens surface and a marginal ray of light passing through the lens surface.

The first lens may have a positive refractive power. Also, the first lens may have a meniscus shape convex toward the object side of the optical imaging system. In other words, a first surface of the first lens may be convex, and a second surface of the first lens may be concave.

At least one of the first surface and the second surface of the first lens may be aspherical. For example, both surfaces of the first lens may be aspherical.

The second lens may have a negative refractive power. Also, the second lens may have a meniscus shape convex toward the object side of the optical imaging system. In other words, the first surface of the second lens may be convex, and the second surface of the second lens may be concave.

At least one of the first surface and the second surface of the second lens may be aspherical. For example, both surfaces of the second lens may be aspherical.

The third lens may have a positive refractive power. Also, the third lens may have a meniscus shape convex toward the image side of the optical imaging system. In other words, the first surface of the third lens may be concave, and the second surface of the third lens may be convex.

Alternatively, both surfaces of the third lens may be convex. In other words, the first and second surfaces of the third lens may be convex.

Alternatively, the third lens may have a meniscus shape convex toward the object side of the optical imaging system. In other words, the first surface of the third lens may be convex, and the second surface of the third lens may be concave.

At least one of the first surface and the second surface of the third lens may be aspherical. For example, both surfaces of the third lens may be aspherical.

The fourth lens may have a negative refractive power. Also, the fourth lens may have a meniscus shape convex toward the object side of the optical imaging system. In other words, the first surface of the fourth lens may be convex, and the second surface of the third lens may be concave.

At least one of the first surface and the second surface of the fourth lens may be aspherical. For example, both surfaces of the fourth lens may be aspherical.

The fifth lens may have a negative refractive power. Also, the fifth lens may have a meniscus shape convex toward the object side of the optical imaging system. In other words, the first surface of the fifth lens may be convex in a paraxial region, and the second surface of the fifth lens may be concave in a paraxial region.

At least one of the first surface and the second surface of the fifth lens may be aspherical. For example, both surfaces of the fifth lens may be aspherical.

The fifth lens may have at least one inflection point formed on at least one of the first surface and the second surface. For example, the first surface of the fifth lens may be convex in a paraxial region and may be concave in portions other than a paraxial region. The second surface of the fifth lens may be concave in a paraxial region, and may be convex in portions other than a paraxial region.

The sixth lens may have a positive refractive power. Also, the sixth lens may have a meniscus shape convex toward the object side of the optical imaging system. In other words, the first surface of the sixth lens may be convex in a paraxial region, and the second surface may be concave in a paraxial region.

At least one of the first surface and the second surface of the sixth lens may be aspherical. For example, both surfaces of the sixth lens may be aspherical.

The sixth lens may have at least one inflection point formed on at least one of the first surface and the second surface. For example, the first surface of the sixth lens may be convex in a paraxial region and may be concave in portions other than a paraxial region. The second surface of the sixth lens may be concave in a paraxial region and may be convex in portions other than a paraxial region The seventh lens may have a negative refractive power. Also, the seventh lens may have a meniscus shape convex toward the object side of the optical imaging system. In include a stop (not shown), a filter 180, and an image sensor 190.

Optical characteristics of each element (a radius of curvature of each surface of the element, a thickness of the element or a distance between the element and a next element, a refractive index, an Abbe number, and a focal length) of the optical imaging system are listed in Table 1 below.

TABLE 1

| Surface No. | Element | Radius of Curvature | Thickness or Distance | Refractive Index | Abbe Number | Focal Length |
|---|---|---|---|---|---|---|
| S1 | First Lens | 2.28041 | 0.938587 | 1.5462 | 55.96 | 5.28811 |
| S2 | | 9.25794 | 0.0462435 | | | |
| S3 | Second Lens | 6.71524 | 0.273305 | 1.6769 | 19.24 | −14.4561 |
| S4 | | 3.91701 | 0.463051 | | | |
| S5 | Third Lens | −36.8655 | 0.365451 | 1.5704 | 37.36 | 45.098 |
| S6 | | −15.2053 | 0.208521 | | | |
| S7 | Fourth Lens | 274.567 | 0.292760 | 1.6769 | 19.24 | −32.2585 |
| S8 | | 20.2197 | 0.532776 | | | |
| S9 | Fifth Lens | 13.5185 | 0.431686 | 1.5704 | 37.36 | −58.1441 |
| S10 | | 9.49223 | 0.394963 | | | |
| S11 | Sixth Lens | 2.79911 | 0.803752 | 1.5366 | 55.69 | 5.88235 |
| S12 | | 22.2452 | 0.648331 | | | |
| S13 | Seventh Lens | 10.4071 | 0.5 | 1.5366 | 55.69 | −4.60759 |
| S14 | | 1.96429 | 0.321401 | | | |
| S15 | Filter | Infinity | 0.21 | 1.5183 | 64.20 | |
| S16 | | Infinity | 0.5697843 | | | |
| S17 | Imaging Plane | Infinity | | | | | other words, the first surface of the seventh lens may be convex in a paraxial region, and the second surface may be concave in a paraxial region.

Alternatively, both surfaces of the seventh lens may be concave. In other words, the first surface and the second surface of the seventh lens may be concave in a paraxial region.

At least one of the first surface and the second surface of the seventh lens may be aspherical. For example, both surfaces of the seventh lens may be aspherical.

At least one inflection point may be formed on at least one of the first surface and the second surface of the seventh lens. For example, the first surface of the seventh lens may be convex in a paraxial region and may be concave in portions other than a paraxial region. The second surface of the seventh lens may be concave in a paraxial region and may be convex in portions other than a paraxial region.

The first lens and the second lens may be made of plastic materials having different optical properties, and the second lens and the third lens may be made of plastic materials having different optical properties. Also, the first to third lenses may be made of plastic materials having different optical properties.

At least two of the first to seventh lenses may have a refractive index greater than 1.66.

Among the first to fourth lenses, a lens having a negative refractive power may have a refractive index greater than 1.66. For example, the second lens and the fourth lens may have a negative refractive power and may have a refractive index greater than 1.66.

Figure 2:
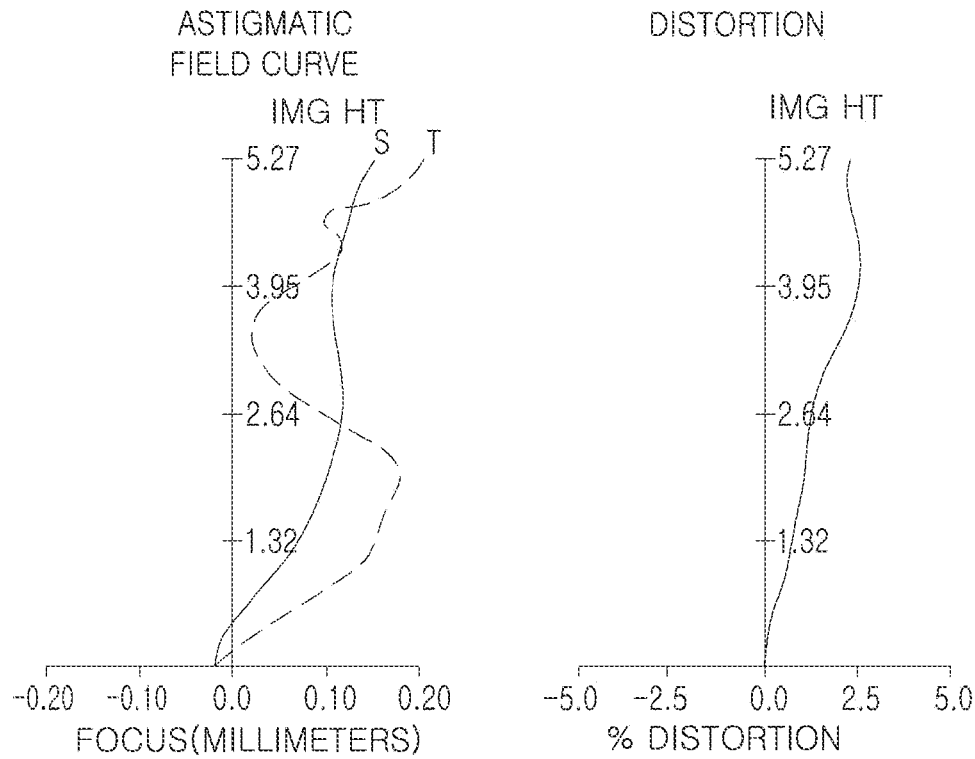
FIG. 2 is a diagram illustrating aberration properties of the optical imaging system illustrated in FIG. 1.

FIG. 1 is a diagram illustrating a first example of an optical imaging system, and FIG. 2 is a diagram illustrating aberration properties of the optical imaging system illustrated in FIG. 1.

The optical imaging system of the first example may include an optical system including a first lens 110, a second lens 120, a third lens 130, a fourth lens 140, a fifth lens 150, a sixth lens 160, and a seventh lens 170, and may further A focal length f of the optical imaging system of the first example is 5.74564 mm, f12 is 7.3574 mm, Fno is 1.75, FOV is 83°, IMG HT is 5.272 mm, SD5 is 2.51 mm, SD6 is 3.804 mm, and SD7 is 4.4013 mm.

f12 is a combined focal length of the first lens and the second lens, Fno is f-number of the optical imaging system, which is equal to the focal length f of the optical imaging system divided by an entrance pupil diameter of the optical imaging system and is indicative of a brightness of the optical imaging system, FOV is a field of view of the optical imaging system, IMG HT is one half of a diagonal length of the imaging plane of the image sensor, SD5 is an effective aperture radius of the image-side surface of the fifth lens, SD6 is an effective aperture radius of the image-side surface of the sixth lens, and SD7 is an effective aperture radius of the image-side surface of the seventh lens.

In the first example, the first lens 110 may have a positive refractive power, the first surface of the first lens 110 may be convex, and the second surface of the first lens 110 may be concave.

The second lens 120 may have a negative refractive power, the first surface of the second lens 120 may be convex, and the second surface of the second lens 120 may be concave.

The third lens 130 may have a positive refractive power, the first surface of the third lens 130 may be concave, and the second surface of the third lens 130 may be convex.

The fourth lens 140 may have a negative refractive power, the first surface of the fourth lens 140 may be convex, and the second surface of the fourth lens 140 may be concave.

The fifth lens 150 may have a negative refractive power, the first surface of the fifth lens 150 may be convex in a paraxial region, and the second surface of the fifth lens 150 may be concave in a paraxial region.

Also, at least one inflection point may be formed on at least one of the first and second surfaces of the fifth lens 150. For example, the first surface of the fifth lens 150 may be convex in a paraxial region and may be concave in portions other than a paraxial region. Further, the second surface of the fifth lens 150 may be concave in a paraxial region and may be convex in portions other than a paraxial region.

The sixth lens 160 may have a positive refractive power, the first surface of the sixth lens 160 may be convex in a Each surface of the first lens 110 to the seventh lens 170 has the aspherical coefficients listed in Table 2 below. In this example, both the first surface and the second surface of each of the first lens 110 to the seventh lens 170 are aspherical.

TABLE 2

|  | S1 | S2 | S3 | S4 | S5 | S6 | S7 |
|---|---|---|---|---|---|---|---|
| Conic Constant (K) | −0.959 | 22.248 | 17.232 | 3.145 | 95.000 | 90.861 | −95.000 |
| Fourth Coefficient (A) | −0.039 | −0.082 | −0.033 | −0.034 | 0.015 | −0.016 | −0.076 |
| Sixth Coefficient (B) | 0.364 | 0.507 | −0.057 | 0.197 | −0.430 | −0.107 | 0.157 |
| Eighth Coefficient (C) | −1.522 | −2.380 | 0.729 | −0.782 | 3.241 | 0.749 | −0.948 |
| Tenth Coefficient (D) | 4.057 | 7.396 | −3.322 | 1.037 | −15.137 | −3.200 | 3.759 |
| Twelfth Coefficient (E) | −7.310 | −15.603 | 9.246 | 4.324 | 46.576 | 8.912 | −10.162 |
| Fourteenth Coefficient (F) | 9.258 | 23.116 | −17.242 | −24.782 | −98.781 | −17.115 | 19.152 |
| Sixteenth Coefficient (G) | −8.434 | −24.609 | 22.439 | 60.923 | 148.494 | 23.412 | −25.672 |
| Eighteenth Coefficient (H) | 5.593 | 19.044 | −20.805 | −92.199 | −160.566 | −23.182 | 24.758 |
| Twentieth Coefficient (J) | −2.701 | −10.724 | 13.831 | 93.358 | 125.266 | 16.667 | −17.209 |

|  | S8 | S9 | S10 | S11 | S12 | S13 | S14 |
|---|---|---|---|---|---|---|---|
| Conic Constant (K) | 93.313 | 6.992 | −94.848 | −5.318 | 23.563 | −95.000 | −7.361 |
| Fourth Coefficient (A) | −0.050 | −0.080 | −0.117 | −0.016 | 0.037 | −0.113 | −0.057 |
| Sixth Coefficient (B) | −0.032 | 0.089 | 0.084 | 0.009 | −0.005 | 0.058 | 0.023 |
| Eighth Coefficient (C) | 0.207 | −0.112 | −0.068 | −0.012 | −0.011 | −0.024 | −0.008 |
| Tenth Coefficient (D) | −0.597 | 0.133 | 0.055 | 0.008 | 0.009 | 0.008 | 0.002 |
| Twelfth Coefficient (E) | 1.049 | −0.123 | −0.035 | −0.003 | −0.004 | −0.002 | 0.000 |
| Fourteenth Coefficient (F) | −1.233 | 0.083 | 0.016 | 0.001 | 0.001 | 0.000 | 0.000 |
| Sixteenth Coefficient (G) | 1.006 | −0.041 | −0.006 | 0.000 | 0.000 | 0.000 | 0.000 |
| Eighteenth Coefficient (H) | −0.576 | 0.015 | 0.001 | 0.000 | 0.000 | 0.000 | 0.000 |
| Twentieth Coefficient (J) | 0.230 | −0.004 | 0.000 | 0.000 | 0.000 | 0.000 | 0.000 | paraxial region, and the second surface of the sixth lens 160 may be concave in a paraxial region.

At least one inflection point may be formed on at least one of the first and second surfaces of the sixth lens 160. For example, the first surface of the sixth lens 160 may be convex in a paraxial region and may be concave in portions other than a paraxial region. Further, the second surface of the sixth lens 160 may be concave in a paraxial region and may be convex in portions other than a paraxial region.

The seventh lens 170 may have a negative refractive power, the first surface of the seventh lens 170 may be convex in a paraxial region, and the second surface of the seventh lens 170 may be concave in a paraxial region.

At least one inflection point may be formed on at least one of the first and second surfaces of the seventh lens 170. For example, the first surface of the seventh lens 170 may be convex in a paraxial region and may be concave in portions other than a paraxial region. Further, the second surface of the seventh lens 170 may be concave in a paraxial region and may be convex in portions other than a paraxial region.

The optical imaging system having the configuration described above has the aberration properties illustrated in FIG. 2.

Figure 3:
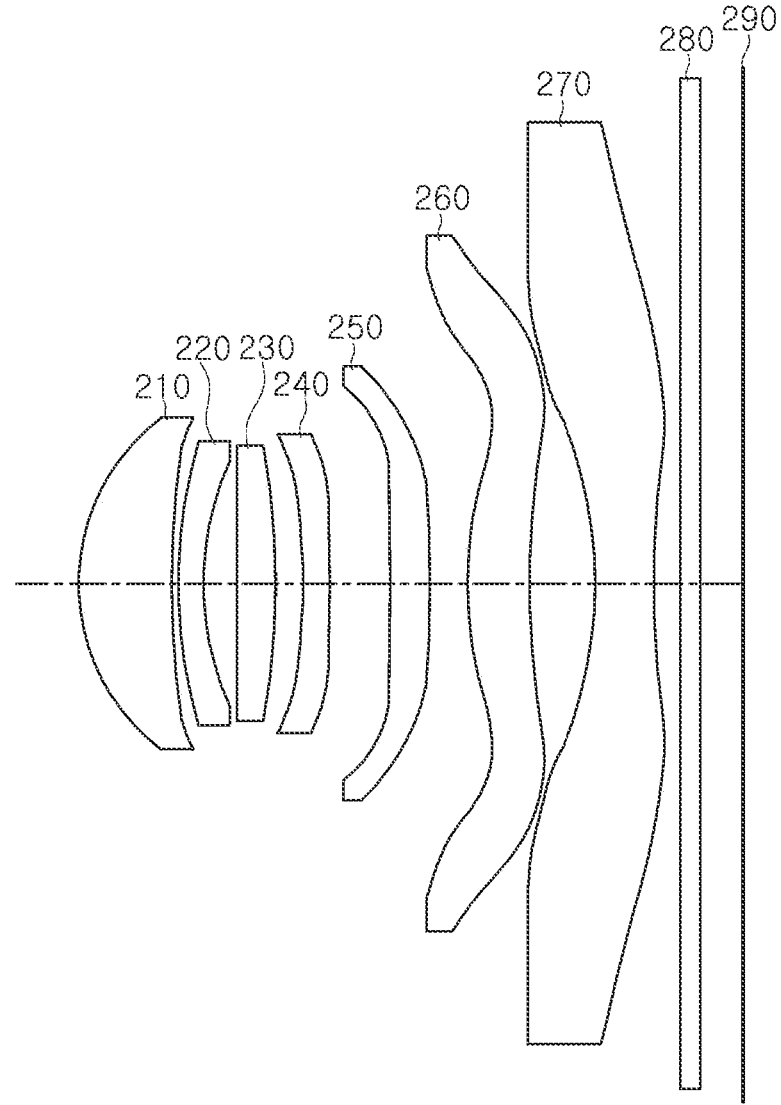
FIG. 3 is a diagram illustrating a second example of an optical imaging system.
Figure 4:
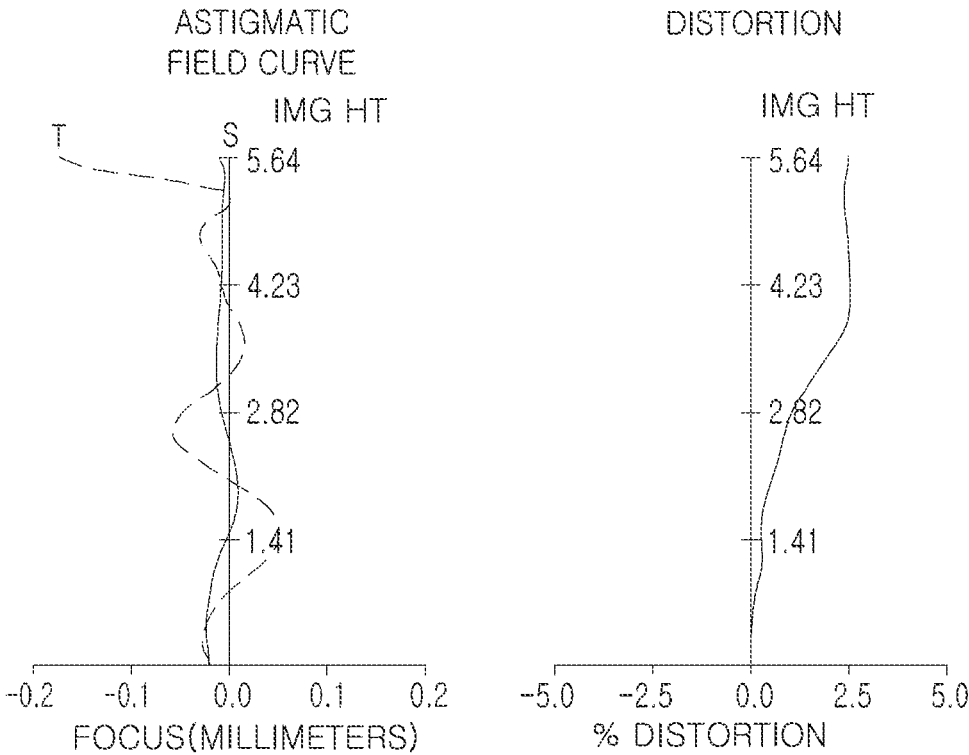
FIG. 4 is a diagram illustrating aberration properties of the optical imaging system illustrated in FIG. 3.

FIG. 3 is a diagram illustrating a second example of an optical imaging system, and FIG. 4 is a diagram illustrating aberration properties of the optical imaging system illustrated in FIG. 3.

The optical imaging system of the second example may include an optical system including a first lens 210, a second lens 220, a third lens 230, a fourth lens 240, a fifth lens 250, a sixth lens 260, and a seventh lens 270, and may further include a stop (not shown), a filter 280, and an image sensor 290.

Optical characteristics of each element (a radius of curvature of each surface of the element, a thickness of the element or a distance between the element and a next element, a refractive index, an Abbe number, and a focal length) of the optical imaging system are listed in Table 3 below.

TABLE 3

| Surface No. | Element | Radius of Curvature | Thickness or Distance | Refractive Index | Abbe Number | Focal Length |
|---|---|---|---|---|---|---|
| S1 | First Lens | 2.29427 | 1.023 | 1.5459 | 56.11 | 5.29301 |
| S2 | | 9.38213 | 0.0628204 | | | |
| S3 | Second Lens | 6.86138 | 0.26 | 1.6776 | 19.25 | −13.5289 |
| S4 | | 3.86409 | 0.385873 | | | |
| S5 | Third Lens | 36.4843 | 0.388203 | 1.6187 | 25.95 | 56.2626 |
| S6 | | −754.986 | 0.299696 | | | |
| S7 | Fourth Lens | 28.8125 | 0.280109 | 1.6776 | 19.25 | −45.6424 |
| S8 | | 14.8574 | 0.686178 | | | |
| S9 | Fifth Lens | 10.1998 | 0.396608 | 1.5704 | 37.36 | −46.2001 |
| S10 | | 7.24956 | 0.420097 | | | |
| S11 | Sixth Lens | 2.85191 | 0.672962 | 1.5459 | 56.11 | 6.45568 |
| S12 | | 13.7016 | 0.708767 | | | |
| S13 | Seventh Lens | −11.9845 | 0.603752 | 1.5459 | 56.11 | −4.72501 |
| S14 | | 3.3455 | 0.339027 | | | |
| S15 | Filter | Infinity | 0.21 | 1.5183 | 64.20 | |
| S16 | | Infinity | 0.462911 | | | |
| S17 | Imaging Plane | Infinity | | | | |

A focal length f of the optical imaging system of the second example is 6.21249 mm, f12 is 7.53789 mm, Fno is 1.88, FOV is 83°, IMG HT is 5.644 mm, SD5 is 2.55 mm, SD6 is 3.85354 mm, and SD7 is 5.1063 mm.

The definitions of f12, Fno, FOV, IMG HT, SD5, SD6, and SD7 are the same as in the first example.

In the second example, the first lens 210 may have a positive refractive power, the first surface of the first lens 210 may be convex, and the second surface of the first lens 210 may be concave.

The second lens 220 may have a negative refractive power, the first surface of the second lens 220 may be convex, and the second surface of the second lens 220 may be concave.

The third lens 230 may have a positive refractive power, and the first and second surfaces of the third lens 230 may be convex.

The fourth lens 240 may have a negative refractive power, the first surface of the fourth lens 240 may be convex, and the second surface of the fourth lens 240 may be concave.

The fifth lens 250 may have a negative refractive power, the first surface of the fifth lens 250 may be convex in a paraxial region, and the second surface of the fifth lens 250 may be concave in a paraxial region.

Also, at least one inflection point may be formed on at least one of the first and second surfaces of the fifth lens 250. For example, the first surface of the fifth lens 250 may be convex in a paraxial region and may be concave in portions other than a paraxial region.

Further, the second surface of the fifth lens 250 may be concave in a paraxial region and may be convex in portions other than a paraxial region.

The sixth lens 260 may have a positive refractive power, the first surface of the sixth lens 260 may be convex in a paraxial region, and the second surface of the sixth lens 260 may be concave in a paraxial region.

At least one inflection point may be formed on at least one of the first and second surfaces of the sixth lens 260. For example, the first surface of the sixth lens 260 may be convex in a paraxial region and may be concave in portions other than a paraxial region. Also, the second surface of the sixth lens 260 may be concave in a paraxial region and may be convex in portions other than a paraxial region.

The seventh lens 270 may have a negative refractive power, and the first and second surfaces of the seventh lens 270 may be concave.

At least one inflection point may be formed on at least one of the first and second surfaces of the seventh lens 270. For example, the first surface of the seventh lens 270 may be concave in a paraxial region and may be convex in portions other than a paraxial region. Further, the second surface of the seventh lens 270 may be concave in a paraxial region and may be convex in portions other than a paraxial region.

Each surface of the first lens 210 to the seventh lens 270 has the aspherical coefficients listed in Table 4 below. In this example, both the first surface and the second surface of each of the first lens 210 to the seventh lens 270 are aspherical.

TABLE 4

| | S1 | S2 | S3 | S4 | S5 | S6 | S7 |
|---|---|---|---|---|---|---|---|
| Conic Constant (K) | −0.925 | 21.109 | 16.894 | 3.315 | −95.000 | 95.000 | 57.741 |
| Fourth Coefficient (A) | −0.017 | −0.039 | −0.049 | −0.017 | 0.021 | −0.016 | −0.026 |
| Sixth Coefficient (B) | 0.169 | 0.081 | 0.083 | 0.018 | −0.422 | −0.039 | −0.340 |
| Eighth Coefficient (C) | −0.603 | −0.223 | −0.229 | −0.050 | 3.041 | 0.247 | 1.956 |
| Tenth Coefficient (D) | 1.381 | 0.570 | 0.735 | 0.365 | −13.574 | −0.860 | −6.857 |
| Twelfth Coefficient (E) | −2.137 | −1.069 | −1.752 | −1.343 | 40.349 | 1.903 | 16.065 |
| Fourteenth Coefficient (F) | 2.321 | 1.420 | 2.904 | 3.020 | −83.357 | −2.801 | −26.358 |
| Sixteenth Coefficient (G) | −1.811 | −1.354 | −3.406 | −4.619 | 122.810 | 2.740 | 31.048 |

TABLE 4-continued

| | | | | | | | |
|---|---|---|---|---|---|---|---|
| Eighteenth Coefficient (H) | 1.026 | 0.937 | 2.874 | 5.025 | -130.759 | -1.699 | -26.561 |
| Twentieth Coefficient (J) | -0.423 | -0.472 | -1.755 | -3.940 | 100.828 | 0.543 | 16.511 |

| | S8 | S9 | S10 | S11 | S12 | S13 | S14 |
|---|---|---|---|---|---|---|---|
| Conic Constant (K) | 53.224 | 7.908 | -95.000 | -7.008 | -8.997 | -8.900 | -19.481 |
| Fourth Coefficient (A) | -0.060 | -0.076 | -0.092 | 0.006 | 0.043 | -0.041 | -0.003 |
| Sixth Coefficient (B) | 0.059 | 0.064 | 0.057 | -0.021 | -0.032 | -0.008 | -0.022 |
| Eighth Coefficient (C) | -0.208 | -0.077 | -0.058 | 0.016 | 0.013 | 0.013 | 0.014 |
| Tenth Coefficient (D) | 0.587 | 0.110 | 0.072 | -0.009 | -0.002 | -0.005 | -0.005 |
| Twelfth Coefficient (E) | -1.160 | -0.136 | -0.073 | 0.004 | 0.000 | 0.001 | 0.001 |
| Fourteenth Coefficient (F) | 1.596 | 0.121 | 0.054 | -0.001 | 0.000 | 0.000 | 0.000 |
| Sixteenth Coefficient (G) | -1.556 | -0.077 | -0.028 | 0.000 | 0.000 | 0.000 | 0.000 |
| Eighteenth Coefficient (H) | 1.091 | 0.035 | 0.011 | 0.000 | 0.000 | 0.000 | 0.000 |
| Twentieth Coefficient (J) | -0.552 | -0.011 | -0.003 | 0.000 | 0.000 | 0.000 | 0.000 |

The optical imaging system having the configuration described above has the aberration properties illustrated in FIG. 4.

Figure 5:
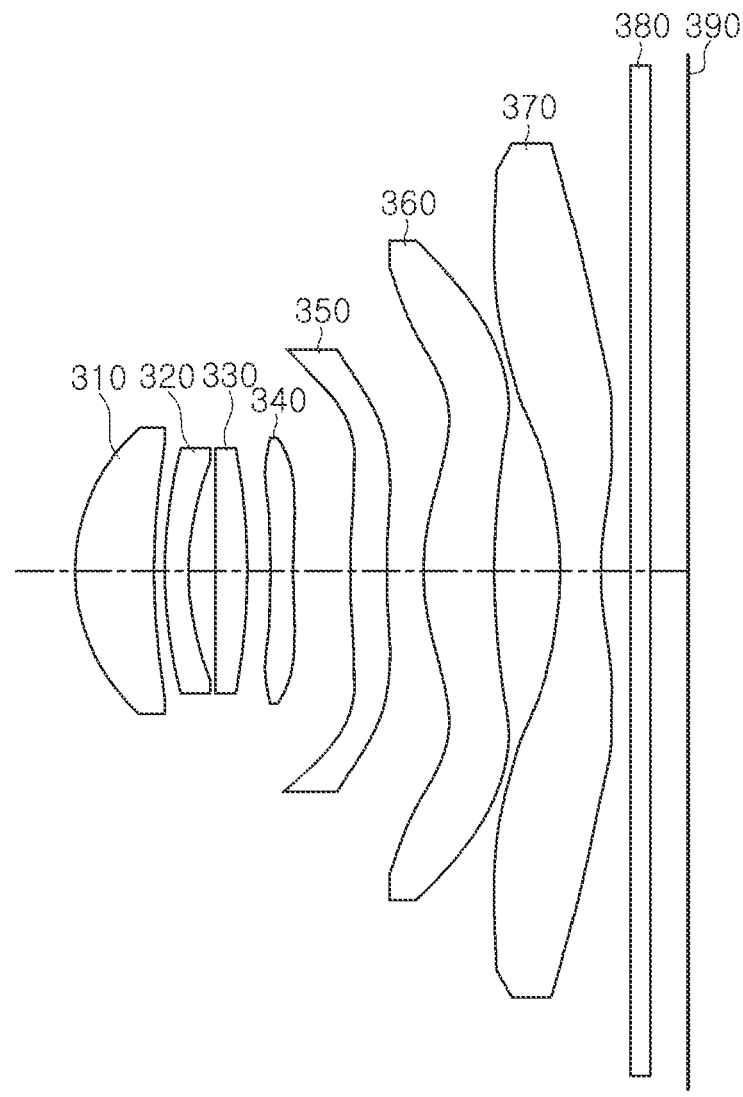
FIG. 5 is a diagram illustrating a third example of an optical imaging system.
Figure 6:
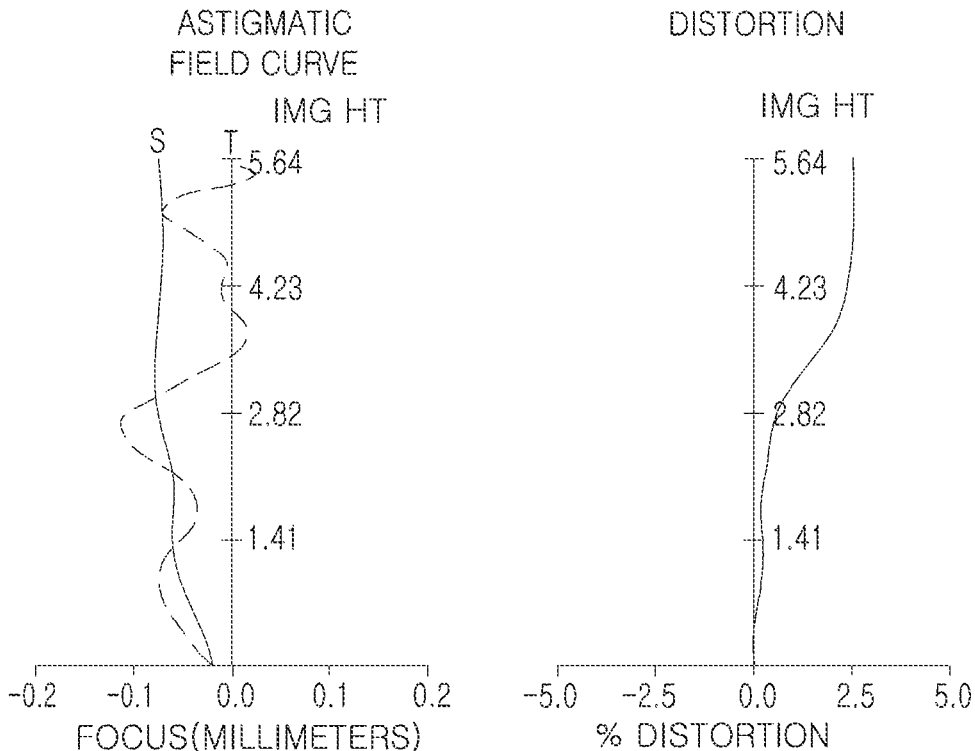
FIG. 6 is a diagram illustrating aberration properties of the optical imaging system illustrated in FIG. 5.

FIG. 5 is a diagram illustrating a third example of an optical imaging system, and FIG. 6 is a diagram illustrating aberration properties of the optical imaging system illustrated in FIG. 5.

The optical imaging system of the third example may include an optical system including a first lens 310, a second lens 320, a third lens 330, a fourth lens 340, a fifth lens 350, a sixth lens 360, and a seventh lens 370, and may further include a stop (not shown), a filter 380, and an image sensor 390.

Optical characteristics of each element (a radius of curvature of each surface of the element, a thickness of the element or a distance between the element and a next element, a refractive index, an Abbe number, and a focal length) of the optical imaging system are listed in Table 5 below.

A focal length f of the optical imaging system of the third example is 6.15697 mm, f12 is 7.69842 mm, Fno is 1.87, FOV is 83°, IMG HT is 5.644 mm, SD5 is 2.755 mm, SD6 is 4 mm, and SD7 is 5.14779 mm.

The definitions of f12, Fno, FOV, IMG HT, SD5, SD6, and SD7 are the same as in the first example.

In the third example, the first lens 310 may have a positive refractive power, the first surface of the first lens 310 may be convex, and the second surface of the first lens 310 may be concave.

The second lens 320 may have a negative refractive power, the first surface of the second lens 320 may be convex, and the second surface of the second lens 320 may be concave.

The third lens 330 may have a positive refractive power, and the first and second surfaces of the third lens 330 may be convex.

TABLE 5

| Surface No. | Element | Radius of Curvature | Thickness or Distance | Refractive Index | Abbe Number | Focal Length |
|---|---|---|---|---|---|---|
| S1 | First Lens | 2.3083 | 0.926279 | 1.5459 | 56.11 | 5.36157 |
| S2 | | 9.37212 | 0.104074 | | | |
| S3 | Second Lens | 6.871 | 0.27 | 1.6776 | 19.25 | -13.558 |
| S4 | | 3.86852 | 0.363672 | | | |
| S5 | Third Lens | 37.6246 | 0.345239 | 1.6187 | 25.95 | 44.1579 |
| S6 | | -99.401 | 0.280264 | | | |
| S7 | Fourth Lens | 37.8645 | 0.28 | 1.6776 | 19.25 | -40.5801 |
| S8 | | 15.8814 | 0.730272 | | | |
| S9 | Fifth Lens | 10.8498 | 0.418965 | 1.5704 | 37.36 | -27.2736 |
| S10 | | 6.30204 | 0.390733 | | | |
| S11 | Sixth Lens | 2.75753 | 0.826713 | 1.5459 | 56.11 | 5.8263 |
| S12 | | 18.53 | 0.760994 | | | |
| S13 | Seventh Lens | -14.6467 | 0.49 | 1.5459 | 56.11 | -4.70273 |
| S14 | | 3.14982 | 0.339027 | | | |
| S15 | Filter | Infinity | 0.21 | 1.5183 | 64.20 | |
| S16 | | Infinity | 0.463769 | | | |
| S17 | Imaging Plane | Infinity | | | | |

The fourth lens 340 may have a negative refractive power, the first surface of the fourth lens 340 may be convex, and the second surface of the fourth lens 340 may be concave.

The fifth lens 350 may have a negative refractive power, the first surface of the fifth lens 350 may be convex in a paraxial region, and the second surface of the fifth lens 350 may be concave in a paraxial region.

Also, at least one inflection point may be formed on at least one of the first and second surfaces of the fifth lens 350. For example, the first surface of the fifth lens 350 may be convex in a paraxial region and may be concave in portions other than a paraxial region. The second surface of the fifth At least one inflection point may be formed on at least one of the first and second surfaces of the seventh lens 370. For example, the first surface of the seventh lens 370 may be concave in a paraxial region and may be convex in portions other than a paraxial region. The second surface of the seventh lens 370 may be concave in a paraxial region and may be convex in portions other than a paraxial region.

Each surface of the first lens 310 to the seventh lens 370 has the aspherical coefficients listed in Table 6 below. In this example, both the first surface and the second surface of each of the first lens 310 to the seventh lens 370 are aspherical.

TABLE 6

|  | S1 | S2 | S3 | S4 | S5 | S6 | S7 |
|---|---|---|---|---|---|---|---|
| Conic Constant (K) | −0.938 | 21.744 | 16.968 | 3.300 | −88.880 | 95.000 | −95.000 |
| Fourth Coefficient (A) | −0.015 | −0.029 | −0.072 | 0.008 | 0.040 | −0.034 | −0.013 |
| Sixth Coefficient (B) | 0.157 | 0.061 | 0.357 | −0.419 | −0.680 | 0.155 | −0.507 |
| Eighth Coefficient (C) | −0.568 | −0.192 | −1.859 | 3.365 | 4.790 | −1.002 | 2.983 |
| Tenth Coefficient (D) | 1.317 | 0.509 | 6.711 | −15.787 | −20.985 | 4.132 | −10.801 |
| Twelfth Coefficient (E) | −2.062 | −0.947 | −16.452 | 49.040 | 61.511 | −11.323 | 26.089 |
| Fourteenth Coefficient (F) | 2.263 | 1.236 | 28.249 | −105.827 | −125.867 | 21.469 | −43.941 |
| Sixteenth Coefficient (G) | −1.781 | −1.155 | −34.785 | 162.932 | 184.370 | −28.957 | 52.909 |
| Eighteenth Coefficient (H) | 1.017 | 0.783 | 31.099 | −181.383 | −195.763 | 28.193 | −46.094 |
| Twentieth Coefficient (J) | −0.421 | −0.387 | −20.216 | 146.308 | 150.894 | −19.879 | 29.079 |

|  | S8 | S9 | S10 | S11 | S12 | S13 | S14 |
|---|---|---|---|---|---|---|---|
| Conic Constant (K) | 61.516 | 11.931 | −82.269 | −6.838 | −2.326 | −4.191 | −15.830 |
| Fourth Coefficient (A) | −0.064 | −0.055 | −0.070 | 0.003 | 0.041 | −0.046 | −0.010 |
| Sixth Coefficient (B) | 0.083 | 0.013 | 0.019 | −0.016 | −0.029 | −0.004 | −0.018 |
| Eighth Coefficient (C) | −0.302 | 0.041 | 0.003 | 0.012 | 0.011 | 0.009 | 0.012 |
| Tenth Coefficient (D) | 0.778 | −0.080 | 0.000 | −0.006 | −0.002 | −0.003 | −0.004 |
| Twelfth Coefficient (E) | −1.391 | 0.081 | −0.008 | 0.002 | 0.000 | 0.001 | 0.001 |
| Fourteenth Coefficient (F) | 1.759 | −0.055 | 0.009 | −0.001 | 0.000 | 0.000 | 0.000 |
| Sixteenth Coefficient (G) | −1.601 | 0.027 | −0.005 | 0.000 | 0.000 | 0.000 | 0.000 |
| Eighteenth Coefficient (H) | 1.060 | −0.010 | 0.002 | 0.000 | 0.000 | 0.000 | 0.000 |
| Twentieth Coefficient (J) | −0.510 | 0.003 | 0.000 | 0.000 | 0.000 | 0.000 | 0.000 | lens 350 may be concave in a paraxial region and may be convex in portions other than a paraxial region.

The sixth lens 360 may have a positive refractive power, the first surface of the sixth lens 360 may be convex in a paraxial region, and the second surface of the sixth lens 360 may be concave in a paraxial region.

At least one inflection point may be formed on at least one of the first and second surfaces of the sixth lens 360. For example, the first surface of the sixth lens 360 may be convex in a paraxial region and may be concave in portions other than a paraxial region. The second surface of the sixth lens 360 may be concave in a paraxial region and may be convex in portions other than a paraxial region.

The seventh lens 370 may have a negative refractive power, and the first and second surfaces of the seventh lens 370 may be concave.

The optical imaging system having the configuration described above has the aberration properties illustrated in FIG. 6.

Figure 7:
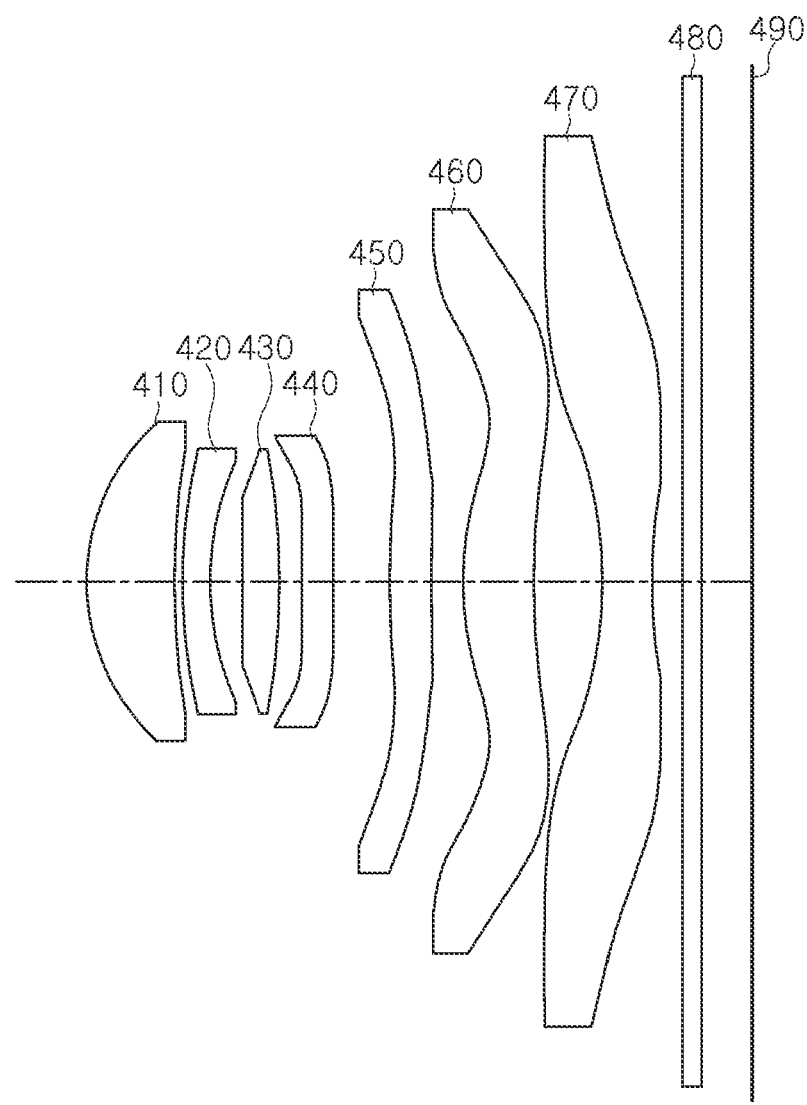
FIG. 7 is a diagram illustrating a fourth example of an optical imaging system.
Figure 8:
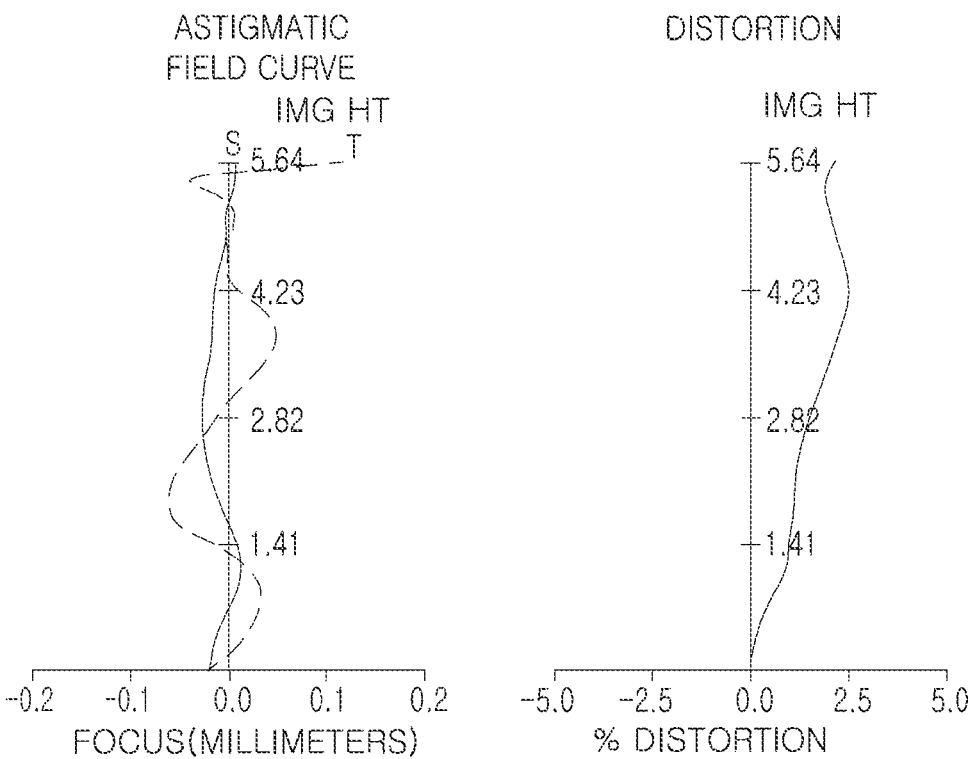
FIG. 8 is a diagram illustrating aberration properties of the optical imaging system illustrated in FIG. 7.

FIG. 7 is a diagram illustrating a fourth example of an optical imaging system, and FIG. 8 is a diagram illustrating aberration properties of the optical imaging system illustrated in FIG. 7.

The optical imaging system of the fourth example may include an optical system including a first lens 410, a second lens 420, a third lens 430, a fourth lens 440, a fifth lens 450, a sixth lens 460, and a seventh lens 470, and may further include a stop (not shown), a filter 480, and an image sensor 490.

Optical characteristics of each element (a radius of curvature of each surface of the element, a thickness of the element or a distance between the element and a next element, a refractive index, an Abbe number, and a focal length) of the optical imaging system are listed in Table 7 below.

TABLE 7

| Surface No. | Element | Radius of Curvature | Thickness or Distance | Refractive Index | Abbe Number | Focal Length |
|---|---|---|---|---|---|---|
| S1 | First Lens | 2.31998 | 0.967215 | 1.5459 | 56.11 | 5.42497 |
| S2 | | 9.1314 | 0.0696496 | | | |
| S3 | Second Lens | 6.81342 | 0.3 | 1.6776 | 19.25 | −13.2649 |
| S4 | | 3.80661 | 0.350527 | | | |
| S5 | Third Lens | 61.427 | 0.393632 | 1.6187 | 25.95 | 40.8995 |
| S6 | | −42.9241 | 0.298373 | | | |
| S7 | Fourth Lens | 45.9659 | 0.3 | 1.6776 | 19.25 | −47.278 |
| S8 | | 18.8282 | 0.616003 | | | |
| S9 | Fifth Lens | 12.2025 | 0.449959 | 1.5704 | 37.36 | −21.592 |
| S10 | | 6.04715 | 0.324875 | | | |
| S11 | Sixth Lens | 2.6353 | 0.777272 | 1.5459 | 56.11 | 5.39462 |
| S12 | | 22.4437 | 0.752502 | | | |
| S13 | Seventh Lens | −25.4299 | 0.5 | 1.5361 | 55.66 | −4.69038 |
| S14 | | 2.80931 | 0.339027 | | | |
| S15 | Filter | Infinity | 0.21 | 1.5183 | 64.20 | |
| S16 | | Infinity | 0.550965 | | | |
| S17 | Imaging Plane | Infinity | | | | |

A focal length f of the optical imaging system of the third example is 6.11088 mm, f12 is 7.88144 mm, Fno is 1.88, FOV is 84°, IMG HT is 5.644 mm, SD5 is 3.195 mm, SD6 is 4.10057 mm, and SD7 is 4.92962 mm.

The definitions of f12, Fno, FOV, IMG HT, SD5, SD6, and SD7 are the same as in the first example.

In the fourth example, the first lens 410 may have a positive refractive power, the first surface of the first lens 410 may be convex, and the second surface of the first lens 410 may be concave.

The second lens 420 may have a negative refractive power, the first surface of the second lens 420 may be convex, and the second surface of the second lens 420 may be concave.

The third lens 430 may have a positive refractive power, and the first and second surfaces of the third lens 430 may be convex.

The fourth lens 440 may have a negative refractive power, the first surface of the fourth lens 440 may be convex, and the second surface of the fourth lens 440 may be concave.

The fifth lens 450 may have a negative refractive power, the first surface of the fifth lens 450 may be convex in a paraxial region, and the second surface of the fifth lens 450 may be concave in a paraxial region.

Also, at least one inflection point may be formed on at least one of the first and second surfaces of the fifth lens 450. For example, the first surface of the fifth lens 450 may be convex in a paraxial region and may be concave in portions other than a paraxial region. Further, the second surface of the fifth lens 450 may be concave in a paraxial region and may be convex in portions other than a paraxial region.

The sixth lens 460 may have a positive refractive power, the first surface of the sixth lens 460 may be convex in a paraxial region, and the second surface of the sixth lens 460 may be concave in a paraxial region.

At least one inflection point may be formed on at least one of the first and second surfaces of the sixth lens 460. For example, the first surface of the sixth lens 460 may be convex in a paraxial region and may be concave in portions other than a paraxial region. The second surface of the sixth lens 460 may be concave in a paraxial region and may be convex in portions other than a paraxial region.

The seventh lens 470 may have a negative refractive power, and the first and second surfaces of the seventh lens 470 may be concave.

At least one inflection point may be formed on at least one of the first and second surfaces of the seventh lens 470. For example, the first surface of the seventh lens 470 may be concave in a paraxial region and may be convex in portions other than a paraxial region. The second surface of the seventh lens 470 may be concave in a paraxial region and may be convex in portions other than a paraxial region.

Each surface of the first lens 410 to the seventh lens 470 has the aspherical coefficients listed in Table 8 below. In this example, both the first surface and the second surface of each of the first lens 410 to the seventh lens 470 are aspherical.

TABLE 8

| | S1 | S2 | S3 | S4 | S5 | S6 | S7 |
|---|---|---|---|---|---|---|---|
| Conic Constant (K) | −0.868 | 21.060 | 17.042 | 3.395 | −94.609 | −37.791 | 88.203 |
| Fourth Coefficient (A) | 0.035 | −0.005 | −0.029 | −0.027 | −0.032 | 0.001 | −0.096 |
| Sixth Coefficient (B) | −0.191 | −0.195 | −0.061 | 0.180 | 0.356 | −0.183 | 0.372 |
| Eighth Coefficient (C) | 0.793 | 1.056 | 0.414 | −1.398 | −3.301 | 0.908 | −1.951 |
| Tenth Coefficient (D) | −2.061 | −3.215 | −1.194 | 7.159 | 18.100 | −2.878 | 6.419 |

US 12,663,612 B2

21

TABLE 8-continued

| | | | | | | | |
|---|---|---|---|---|---|---|---|
| Twelfth Coefficient (E) | 3.612 | 6.470 | 2.246 | −23.970 | −64.583 | 6.108 | −14.255 |
| Fourteenth Coefficient (F) | −4.449 | −9.065 | −2.997 | 55.132 | 157.989 | −8.931 | 22.265 |
| Sixteenth Coefficient (G) | 3.944 | 9.071 | 2.967 | −89.942 | −273.030 | 9.054 | −25.088 |
| Eighteenth Coefficient (H) | −2.546 | −6.562 | −2.253 | 105.829 | 338.436 | −6.259 | 20.664 |
| Twentieth Coefficient (J) | 1.197 | 3.434 | 1.338 | −90.164 | −301.875 | 2.774 | −12.467 |

| | S8 | S9 | S10 | S11 | S12 | S13 | S14 |
|---|---|---|---|---|---|---|---|
| Conic Constant (K) | 91.880 | 12.735 | −90.690 | −6.353 | 19.379 | −6.859 | −13.357 |
| Fourth Coefficient (A) | −0.051 | −0.046 | −0.055 | −0.003 | 0.036 | −0.088 | −0.042 |
| Sixth Coefficient (B) | 0.031 | 0.029 | −0.004 | −0.010 | −0.020 | 0.032 | 0.009 |
| Eighth Coefficient (C) | −0.110 | −0.009 | 0.038 | 0.006 | 0.004 | −0.008 | 0.000 |
| Tenth Coefficient (D) | 0.262 | −0.002 | −0.039 | −0.002 | 0.001 | 0.002 | −0.001 |
| Twelfth Coefficient (E) | −0.426 | 0.003 | 0.024 | 0.001 | −0.001 | −0.001 | 0.000 |
| Fourteenth Coefficient (F) | 0.488 | −0.001 | −0.010 | 0.000 | 0.000 | 0.000 | 0.000 |
| Sixteenth Coefficient (G) | −0.401 | 0.000 | 0.003 | 0.000 | 0.000 | 0.000 | 0.000 |
| Eighteenth Coefficient (H) | 0.239 | 0.000 | −0.001 | 0.000 | 0.000 | 0.000 | 0.000 |
| Twentieth Coefficient (J) | −0.103 | 0.000 | 0.000 | 0.000 | 0.000 | 0.000 | 0.000 |

The optical imaging system having the configuration described above has the aberration properties illustrated in FIG. 8.

Figure 9:
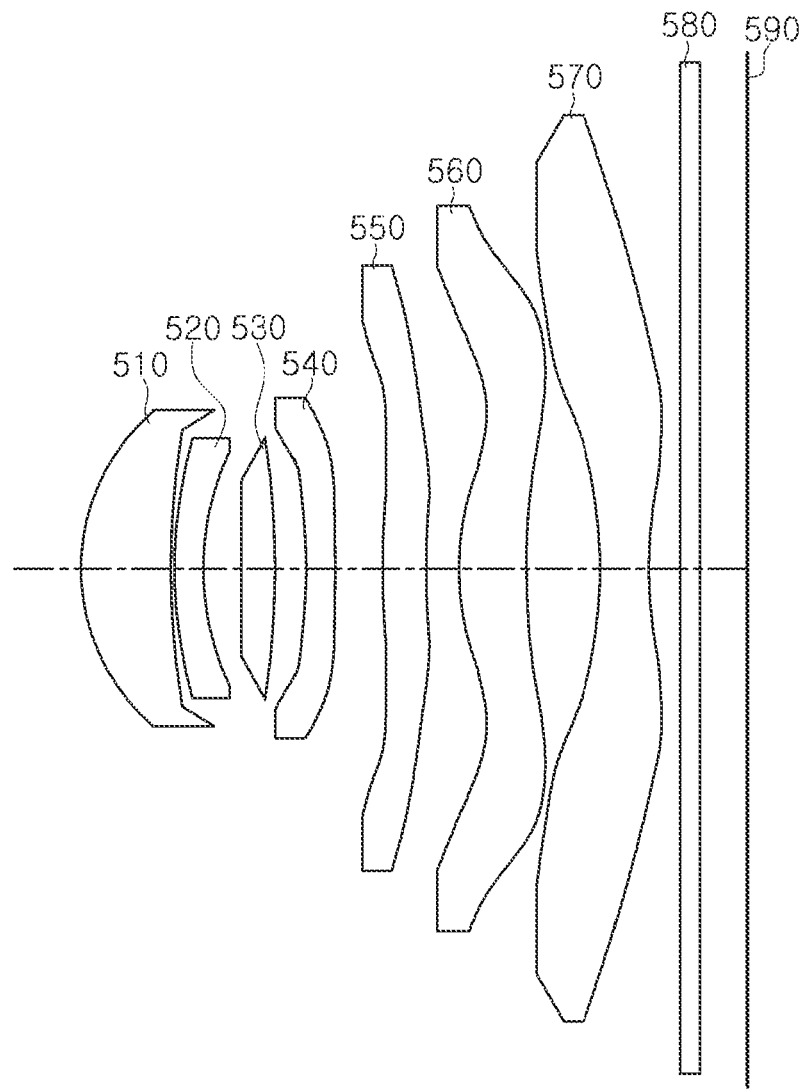
FIG. 9 is a diagram illustrating a fifth example of an optical imaging system.
Figure 10:
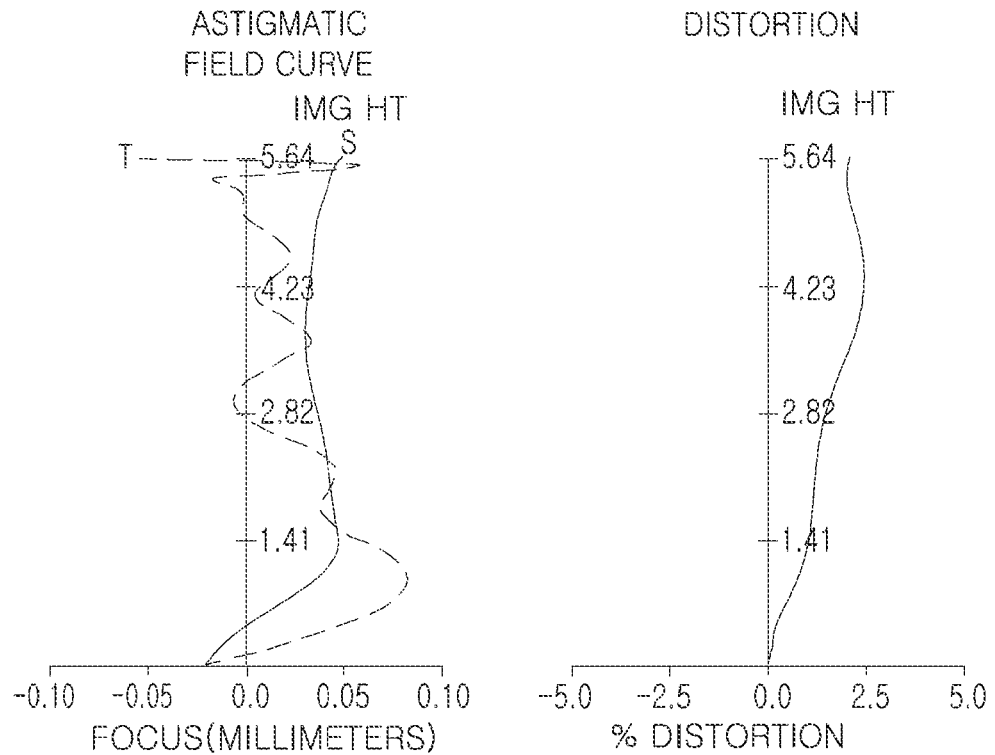
FIG. 10 is a diagram illustrating aberration properties of the optical imaging system illustrated in FIG. 9.

FIG. 9 is a diagram illustrating a fifth example of an optical imaging system, and FIG. 10 is a diagram illustrating aberration properties of the optical imaging system illustrated in FIG. 9.

The optical imaging system of the fifth example may include an optical system including a first lens 510, a second lens 520, a third lens 530, a fourth lens 540, a fifth lens 550, a sixth lens 560, and a seventh lens 570, and may further include a stop (not shown), a filter 580, and an image sensor 590.

Optical characteristics of each element (a radius of curvature of each surface of the element, a thickness of the element or a distance between the element and a next element, a refractive index, an Abbe number, and a focal length) of the optical imaging system are listed in Table 9 below.

TABLE 9

| Surface No. | Element | Radius of Curvature | Thickness or Distance | Refractive Index | Abbe Number | Focal Length |
|---|---|---|---|---|---|---|
| S1 | First Lens | 2.33815 | 0.974522 | 1.5459 | 56.11 | 5.49327 |
| S2 | | 9.04954 | 0.04 | | | |
| S3 | Second Lens | 6.73902 | 0.3 | 1.6776 | 19.25 | −13.6736 |
| S4 | | 3.83116 | 0.414899 | | | |
| S5 | Third Lens | 26.9658 | 0.357568 | 1.5704 | 37.36 | 52.7862 |
| S6 | | 257.243 | 0.327213 | | | |
| S7 | Fourth Lens | 36.3661 | 0.319 | 1.6776 | 19.25 | −48.7836 |
| S8 | | 17.2543 | 0.544789 | | | |
| S9 | Fifth Lens | 11.3895 | 0.483831 | 1.5704 | 37.36 | −26.374 |
| S10 | | 6.38177 | 0.323176 | | | |
| S11 | Sixth Lens | 2.59335 | 0.729815 | 1.5361 | 55.66 | 5.46785 |
| S12 | | 20.2977 | 0.814997 | | | |
| S13 | Seventh Lens | −25.5797 | 0.5 | 1.5361 | 55.66 | −4.68196 |
| S14 | | 2.80181 | 0.339027 | | | |
| S15 | Filter | Infinity | 0.21 | 1.5183 | 64.20 | |
| S16 | | Infinity | 0.521157 | | | |
| S17 | Imaging Plane | Infinity | | | | |

A focal length f of the optical imaging system of the fifth example is 6.08291 mm, f12 is 7.93893 mm, Fno is 1.88, FOV is 84.3°, IMG HT is 5.644 mm, SD5 is 3.3717 mm, SD6 is 4.02459 mm, and SD7 is 5.05356 mm.

The definitions of f12, Fno, FOV, IMG HT, SD5, SD6, and SD7 are the same as in the first example.

In the fifth example, the first lens 510 may have a positive refractive power, the first surface of the first lens 510 may be convex, and the second surface of the first lens 510 may be concave.

The second lens 520 may have a negative refractive power, the first surface of the second lens 520 may be convex, and the second surface of the second lens 520 may be concave.

The third lens 530 may have a positive refractive power, the first surface of the third lens 530 may be convex, and the second surface of the third lens 530 may be concave.

The fourth lens 540 may have a negative refractive power, the first surface of the fourth lens 540 may be convex, and the second surface of the fourth lens 540 may be concave.

The fifth lens 550 may have a negative refractive power, the first surface of the fifth lens 550 may be convex in a paraxial region, and the second surface of the fifth lens 550 may be concave in a paraxial region.

Also, at least one inflection point may be formed on at least one of the first and second surfaces of the fifth lens 550. For example, the first surface of the fifth lens 550 may be convex in a paraxial region and may be concave in portions other than a paraxial region. The second surface of the fifth lens 550 may be concave in a paraxial region and may be convex in portions other than a paraxial region.

The sixth lens 560 may have a positive refractive power, the first surface of the sixth lens 560 may be convex in a paraxial region, and the second surface of the sixth lens 560 may be concave in a paraxial region.

At least one inflection point may be formed on at least one of the first and second surfaces of the sixth lens 560. For example, the first surface of the sixth lens 560 may be convex in a paraxial region and may be concave in portions other than a paraxial region. The second surface of the sixth lens 560 may be concave in a paraxial region and may be convex in portions other than a paraxial region.

The seventh lens 570 may have a negative refractive power, and the first and second surfaces of the seventh lens 570 may be concave.

At least one inflection point may be formed on at least one of the first and second surfaces of the seventh lens 570. For example, the first surface of the seventh lens 570 may be concave in a paraxial region and may be convex in portions other than a paraxial region. Further, the second surface of the seventh lens 570 may be concave in a paraxial region and may be convex in portions other than a paraxial region.

Each surface of the first lens 510 to the seventh lens 570 has the aspherical coefficients listed in Table 10 below. In this example, both the first surface and the second surface of each of the first lens 510 to the seventh lens 570 are aspherical.

TABLE 10

| | S1 | S2 | S3 | S4 | S5 | S6 | S7 |
|---|---|---|---|---|---|---|---|
| Conic Constant (K) | −0.898 | 21.147 | 16.981 | 3.368 | 79.145 | 95.000 | −17.302 |
| Fourth Coefficient (A) | 0.013 | −0.030 | −0.027 | −0.039 | −0.048 | −0.014 | −0.085 |
| Sixth Coefficient (B) | −0.034 | 0.025 | −0.051 | 0.342 | 0.428 | −0.045 | 0.355 |
| Eighth Coefficient (C) | 0.174 | 0.028 | 0.419 | −2.249 | −2.987 | 0.311 | −1.930 |
| Tenth Coefficient (D) | −0.537 | −0.113 | −1.270 | 9.731 | 13.156 | −1.413 | 6.553 |
| Twelfth Coefficient (E) | 1.107 | 0.059 | 2.139 | −28.602 | −39.189 | 4.194 | −14.950 |
| Fourteenth Coefficient (F) | −1.580 | 0.352 | −1.733 | 59.102 | 82.057 | −8.429 | 23.869 |
| Sixteenth Coefficient (G) | 1.600 | −0.983 | −0.509 | −87.714 | −123.531 | 11.802 | −27.351 |
| Eighteenth Coefficient (H) | −1.163 | 1.327 | 3.023 | 94.476 | 135.129 | −11.717 | 22.785 |
| Twentieth Coefficient (J) | 0.607 | −1.117 | −3.757 | −73.872 | −107.407 | 8.296 | −13.825 |

| | S8 | S9 | S10 | S11 | S12 | S13 | S14 |
|---|---|---|---|---|---|---|---|
| Conic Constant (K) | 44.471 | 9.592 | −69.231 | −5.764 | 21.077 | −30.344 | −12.145 |
| Fourth Coefficient (A) | −0.043 | −0.051 | −0.077 | −0.002 | 0.048 | −0.074 | −0.037 |
| Sixth Coefficient (B) | 0.000 | 0.038 | 0.032 | −0.005 | −0.020 | 0.027 | 0.008 |
| Eighth Coefficient (C) | 0.012 | −0.021 | −0.008 | −0.003 | −0.002 | −0.009 | −0.001 |
| Tenth Coefficient (D) | −0.023 | 0.008 | 0.001 | 0.004 | 0.005 | 0.003 | 0.000 |
| Twelfth Coefficient (E) | 0.003 | −0.002 | 0.000 | −0.002 | −0.003 | −0.001 | 0.000 |
| Fourteenth Coefficient (F) | 0.046 | 0.000 | 0.000 | 0.001 | 0.001 | 0.000 | 0.000 |
| Sixteenth Coefficient (G) | −0.080 | 0.000 | 0.000 | 0.000 | 0.000 | 0.000 | 0.000 |

TABLE 10-continued

| | | | | | | | |
|---|---|---|---|---|---|---|---|
| Eighteenth Coefficient (H) | 0.073 | 0.000 | 0.000 | 0.000 | 0.000 | 0.000 | 0.000 |
| Twentieth Coefficient (J) | −0.042 | 0.000 | 0.000 | 0.000 | 0.000 | 0.000 | 0.000 |

The optical imaging system having the configuration described above has the aberration properties illustrated in FIG. 10.

Table 11 below lists the values of Conditional Expressions 1 to 25 of the optical imaging system for each of the first to fifth examples.

TABLE 11

| Conditional Expression | First Example | Second Example | Third Example | Fourth Example | Fifth Example |
|---|---|---|---|---|---|
| 0 < f1/f < 2 | 0.920 | 0.852 | 0.871 | 0.888 | 0.903 |
| 25 < v1 − v2 < 45 | 36.723 | 36.868 | 36.868 | 36.868 | 36.868 |
| 15 < v1 − v3 < 45 | 18.604 | 30.160 | 30.160 | 30.160 | 18.757 |
| 25 < v1 − v4 < 45 | 36.723 | 36.868 | 36.868 | 36.868 | 36.868 |
| 15 < v1 − v5 < 45 | 18.604 | 18.757 | 18.757 | 18.757 | 18.757 |
| −3.5 < f2/f < 0 | −2.516 | −2.178 | −2.202 | −2.171 | −2.248 |
| f3/f > 1.5 | 7.849 | 9.056 | 7.172 | 6.693 | 8.678 |
| −9 < f4/f < 0 | −5.614 | −7.347 | −6.591 | −7.737 | −8.020 |
| −30 < f5/f < 20 | −10.120 | −7.437 | −4.430 | −3.533 | −4.336 |
| 0 < f6/f < 2 | 1.024 | 1.039 | 0.946 | 0.883 | 0.899 |
| −2 < f7/f < 0 | −0.802 | −0.761 | −0.764 | −0.768 | −0.770 |
| TTL/f < 1.4 | 1.218 | 1.159 | 1.169 | 1.178 | 1.184 |
| −1 < f1/f2 < 0 | −0.366 | −0.391 | −0.395 | −0.409 | −0.402 |
| −2 < f2/f3 < 0 | −0.321 | −0.240 | −0.307 | −0.324 | −0.259 |
| BFL/f < 0.4 | 0.192 | 0.163 | 0.164 | 0.180 | 0.176 |
| D1/f < 0.3 | 0.008 | 0.010 | 0.017 | 0.011 | 0.007 |
| 0.4 < SD5/IMG HT < 0.7 | 0.476 | 0.452 | 0.488 | 0.566 | 0.597 |
| 0.6 < SD6/IMG HT < 0.8 | 0.722 | 0.683 | 0.709 | 0.727 | 0.713 |
| 0.7 < SD7/IMG HT < 1 | 0.835 | 0.905 | 0.912 | 0.873 | 0.895 |
| 0 < f2/f7 < 5 | 3.137 | 2.863 | 2.883 | 2.828 | 2.920 |
| −5 < f2/f6 < 0 | −2.458 | −2.096 | −2.327 | −2.459 | −2.501 |
| 74° < FOV < 90° | 83° | 83° | 83° | 84° | 84.3° |
| Fno < 2.0 | 1.75 | 1.88 | 1.87 | 1.88 | 1.88 |
| TTL/(2 * IMG HT) ≤ 0.67 | 0.664 | 0.638 | 0.638 | 0.638 | 0.638 |
| 1 < f12/f < 2 | 1.281 | 1.213 | 1.25 | 1.29 | 1.305 |

According to the examples described above, the optical imaging system has a high resolution and a reduced size.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:

a first lens having a positive refractive power, a convex object-side surface in a paraxial region thereof, and a concave image-side surface in a paraxial region thereof;

a second lens having a negative refractive power, a convex object-side surface in a paraxial region thereof, and a concave image-side surface in a paraxial region thereof;

a third lens having a positive refractive power, a convex object-side surface in a paraxial region thereof, and a convex image-side surface in a paraxial region thereof;

a fourth lens having a negative refractive power, a convex object-side surface in a paraxial region thereof, and a concave image-side surface in a paraxial region thereof;

a fifth lens having a refractive power, a convex object-side surface in a paraxial region thereof, and a concave image-side surface in a paraxial region thereof;

a sixth lens having a refractive power; and a seventh lens having a refractive power, wherein the first to seventh lenses are sequentially disposed in ascending numerical order along an optical axis from an object side of the optical imaging system toward an imaging plane of the optical imaging system, the optical imaging system has a total of seven lenses, the second lens and the fourth lens each have a refractive index greater than 1.66, 74°<FOV<90° is satisfied, where FOV is a field of view of the optical imaging system, −30<f5/f<20 is satisfied, where f5 is a focal length of the fifth lens, and f is a focal length of the optical imaging system, and 15<v1−v3<45 is satisfied, where v1 is an Abbe number of the first lens, and v3 is an Abbe number of the third lens.

2. The optical imaging system of claim 1, wherein −1<f1/f2<0 is satisfied, where f1 is a focal length of the first lens, and f2 is a focal length of the second lens.

3. The optical imaging system of claim 2, wherein 1<f12/f<2 is satisfied, where f12 is a combined focal length of the first lens and the second lens, and f is the focal length of the optical imaging system.

4. The optical imaging system of claim 2, wherein 0<f1/f<2 is satisfied, where f is the focal length of the optical imaging system.

5. The optical imaging system of claim 2, wherein 0<f1/f<2 and −3.5<f2/f<0 are satisfied, and f is the focal length of the optical imaging system.

6. The optical imaging system of claim 2, wherein f3/f>1.5 is satisfied, where f3 is a focal length of the third lens, and f is the focal length of the optical imaging system.

7. The optical imaging system of claim 6, wherein −2<f2/f3<0 is satisfied.

8. The optical imaging system of claim 1, wherein −9<f4/f<0 is satisfied, where f4 is a focal length of the fourth lens, and f is the focal length of the optical imaging system.

9. The optical imaging system of claim 1, wherein 25<v1-v2<45 and 25<v1-v4<45 are satisfied, where v2 is an Abbe number of the second lens, and v4 is an Abbe number of the fourth lens.

10. The optical imaging system of claim 1, wherein $15<v1-v5<45$ is satisfied, where v5 is an Abbe number of the fifth lens.

11. The optical imaging system of claim 1, wherein $0<f6/f<2$ is satisfied, where f6 is a focal length of the sixth lens, and f is the focal length of the optical imaging system.

12. The optical imaging system of claim 1, wherein $-2<f7/f<0$ is satisfied, where f7 is a focal length of the seventh lens, and f is the focal length of the optical imaging system.

13. The optical imaging system of claim 12, wherein $0<f2/f7<5$ is satisfied, where f2 is a focal length of the second lens.

14. The optical imaging system of claim 1, wherein $-5<f2/f6<0$ is satisfied, where f2 is a focal length of the second lens, and f6 is a focal length of the sixth lens.

15. The optical imaging system of claim 1, wherein $D1/f<0.3$, $BFL/f<0.4$, and $TTL/f<1.4$ are satisfied, where D1 is a distance along the optical axis from the image-side surface of the first lens to the object-side surface of the second lens, BFL is a distance along the optical axis from an image-side surface of the seventh lens to the imaging plane, TTL is a distance along the optical axis from the object-side surface of the first lens to the imaging plane, and f is the focal length of the optical imaging system.

16. The optical imaging system of claim 15, wherein $TTL/(2*IMG\ HT) \leq 0.67$ is satisfied, where IMG HT is one half of a diagonal length of the imaging plane.

17. The optical imaging system of claim 1, wherein $Fno<2.0$ is satisfied, where Fno is an f-number of the optical imaging system.

18. The optical imaging system of claim 1, wherein the sixth lens has a convex object-side surface in a paraxial region thereof and a concave image-side surface in a paraxial region thereof.

19. The optical imaging system of claim 1, wherein the seventh lens has a negative refractive power and a concave image-side surface in a paraxial region thereof.

\* \* \* \* \*